(12) United States Patent
Stojanovski

(10) Patent No.: US 10,136,269 B2
(45) Date of Patent: *Nov. 20, 2018

(54) MOBILITY MANAGEMENT ENTITY HAVING MOBILE SWITCHING CENTER FUNCTIONALITY

(71) Applicant: LG ELECTRONICS INC., Seoul (KR)

(72) Inventor: Saso Stojanovski, Paris (FR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/234,820

(22) Filed: Aug. 11, 2016

(65) Prior Publication Data

US 2016/0353259 A1 Dec. 1, 2016

Related U.S. Application Data

(63) Continuation of application No. 14/347,210, filed as application No. PCT/KR2012/007916 on Sep. 28, 2012, now Pat. No. 9,445,246.

(Continued)

(51) Int. Cl.
*H04W 88/16* (2009.01)
*H04W 4/14* (2009.01)
(Continued)

(52) U.S. Cl.
CPC .............. *H04W 4/14* (2013.01); *H04W 4/70* (2018.02); *H04W 8/04* (2013.01); *H04L 63/0892* (2013.01); *H04W 88/16* (2013.01)

(58) Field of Classification Search
None
See application file for complete search history.

(56) References Cited

U.S. PATENT DOCUMENTS

2009/0042569 A1  2/2009  Shaheen ................. 455/435.2
2010/0056175 A1  3/2010  Bachmann et al.
(Continued)

FOREIGN PATENT DOCUMENTS

CN  201185432  1/2009
CN  101448217  6/2009
(Continued)

OTHER PUBLICATIONS

The State Intellectual Property Office of the People's Republic of China Application Serial No. 201280048807.1, Office Action dated Dec. 2, 2016, 18 pages.
(Continued)

*Primary Examiner* — Vladimir Magloire
*Assistant Examiner* — Donald H. B. Braswell
(74) *Attorney, Agent, or Firm* — Lee Hong Degerman Kang Waimey

(57) ABSTRACT

A Mobility Management Entity (MME) comprises at least one entity or layer having Mobile Switching Center (MSC) functionality to support a Short Messaging Service (SMS) between a network and a mobile station by employing Machine-to-Machine (M2M) or Machine Type Communication (MTC) protocols. A first state machine entity or layer that supports relay functions to perform forwarding of SMS messages to the mobile station. A second state machine entity or layer that supports connection functions with at least an HSS/HLR (Home Subscriber Server/Home Location Register), and with an SMS-SC (Short Messaging Service-Service Center) or GMSC/IWMSC (Gateway MSC/Interworking MSC).

10 Claims, 5 Drawing Sheets

Related U.S. Application Data

(60) Provisional application No. 61/542,757, filed on Oct. 3, 2011.

(51) Int. Cl.
*H04W 8/04* (2009.01)
*H04W 88/00* (2009.01)
*H04W 4/70* (2018.01)
*H04L 29/06* (2006.01)

(56) References Cited

U.S. PATENT DOCUMENTS

| | | | |
|---|---|---|---|
| 2010/0261490 A1 | 10/2010 | Berry et al. | 455/466 |
| 2010/0281148 A1 | 11/2010 | Turanyi et al. | |
| 2011/0021216 A1* | 1/2011 | Pudney | H04W 4/12 455/466 |
| 2011/0098063 A1* | 4/2011 | Richardson | H04W 4/14 455/466 |
| 2011/0105117 A1 | 5/2011 | Chin et al. | |
| 2011/0165898 A1 | 7/2011 | Drevon et al. | |
| 2012/0135761 A1* | 5/2012 | Nenner | H04W 4/14 455/466 |
| 2013/0155920 A1* | 6/2013 | Lim | H04W 4/12 370/310 |

FOREIGN PATENT DOCUMENTS

| | | |
|---|---|---|
| WO | 2011/012305 | 2/2011 |
| WO | 11/059646 | 5/2011 |
| WO | 2011087239 | 7/2011 |

OTHER PUBLICATIONS

The State Intellectual Property Office of the People's Republic of China Application Serial No. 201280048934.1, Office Action dated Jan. 5, 2017, 12 pages.
3GPP TS 23.272 v10.5.0 (Sep. 2011) 3rd Generation Partnership Project; Technical Specification Group Services and System Aspects; Circuit Switche (CS) fallback in Evolved Packet System (EPS) Stage 2 (Release 10).
3GPP TS 24.011 v10.0.0 (Feb. 2011) 3rd Generation Partnership Project; Technical Specification Group Core Network and Terminals; Point-to-Point (PP) Short Message Service (SMS) support on mobile radio interface (Release 10).
Japan Patent Office Application No. 2014-534470, Notice of Allowance dated Mar. 29, 2016, 3 pages.
Vodafone, Discussion on the technical aspects of "Native SMS over LTE", TD S2-094610, 3GPP TSG SA WG2 Meeting #74, Jul. 2009, 8 pages.
3rd Generation Partnership Project, "Technical Specification Group Services and System Aspects; System Improvements for Machine-Type Communications", 3GPP TR 23.888 V1.5.0, Oct. 2011, 21 pages.
LG Electronics, Optimised architecture for SMS over SGs (or"Native SMS for LTE" revisited), S2-114374, SA WG2 Meeting #87, Oct. 2011, 6 pages.
Korean Intellectual Property Office Application Serial No. 10-2004-7009706, Notice of Allowance dated Feb. 5, 2016, 7 pages.
3rd Generation Partnership Project (3GPP), "Technical Specification Group Services and System Aspects; General Packet Radio Service (GPRS) enhancements for Evolved Universal Terrestrial Radio Access Network (E-UTRAN) access (Release 8)," 3GPP TS 23.401 V8.6.0, Jun. 2009, 227 pages.
Korean Intellectual Property Office Application Serial No. 10-2014-7009705, Office Action dated Apr. 30, 2015, 4 pages.
Vodafone, "SMS over LTE in SIMTC," 3GPP TSG SA WG2 Meeting #84, TD S2-111554, XP050524491, Apr. 2011, 5 pages.
3rd Generation Partnership Project (3GPP), "Technical Specification Group Services and System Aspects; Circuit Switched (CS) fallback in Evolved Packet System (EPS); Stage 2 (Release 10)," 3GPP TS 23.272 V10.5.0, Sep. 2011, XP050553745, 79 pages.
3rd Generation Partnership Project (3GPP), "Technical Specification Group Core Network and Terminals; Technical realization of the Short Message Service (SMS) (Release 11)," 3GPP TS 23.040 V11.3.0, XP050649393, Sep. 2012, 208 pages.
3rd Generation Partnership Project (3GPP), "Technical Specification Group Services and System Aspects; Circuit Switched (CS) fallback in Evolved Packet System (EPS); Stage 2 (Release 11)," 3GPP TS 23.272 V11.2.0, XP050649055, Sep. 2012, 90 pages.
European Patent Office Application Serial No. 12837680.3, Search Report dated May 18, 2015, 10 pages.
State Intellectual Property Office of the People's Republic of China Application Serial No. 201280048807.1, Office Action dated Apr. 24, 2017, 9 pages.
3rd Generation Partnership Project (3GPP), "Technical Specification Group Services and System Aspects; General Packet Radio Service (GPRS) enhancements for Evolved Universal Terrestrial Radio Access Network (E-UTRAN) access (Release 10)," 3GPP TS 23.401 V10.5.0, Sep. 2011, 282 pages.
European Patent Office Application Serial No. 12837680.3, Office Action dated Dec. 7, 2017, 8 pages.
LG Electronics, "Optimised architecture for SMS over SGs (or "Native SMS for LTE" revisited)", SA WG2 Meeting #87, S2-114665 (revision of S2-114587), Oct. 2011, 4 pages.

\* cited by examiner

MOBILITY MANAGEMENT ENTITY HAVING MOBILE SWITCHING CENTER FUNCTIONALITY

CROSS-REFERENCE TO RELATED APPLICATIONS

This application is a continuation of U.S. patent application No. 14/347,210, filed on Mar. 25, 2014, now U.S. Pat. No. 9,445,246, which is the National Stage filing under 35 U.S.C. 371 of International Application No. PCT/KR2012/007916, filed on Sep. 28, 2012, which claims the benefit of U.S. Provisional Application No. 61/542,757, filed on Oct. 3, 2011, the contents of which are all hereby incorporated by reference herein in their entirety.

BACKGROUND ART

The following description is related to wireless communications. In the background art, SMS-related procedure could not be fully and properly supported in certain types of wireless communication systems. Further, the so-called Machine-to-Machine (M2M) communications or Machine Type Communications (MTC) could not be fully and properly supported in certain types of wireless communication systems.

DISCLOSURE

Technical Solution

The following features are applicable to an apparatus and a method used in a wireless communication. In particular, a method of handling signals to register a Mobility Management Entity (MME) for Short Messaging Service (SMS) between a wireless network and a mobile station (MS) is further provided. In the method, a Mobility Management Entity (MME) is implemented with at least one entity or layer having Mobile Switching Center (MSC) functionality to support a Short Messaging Service (SMS) between a network and a mobile station. The above feature is also applicable to MTC or M2M features, such as MTC device triggering.

The MME, which is newly defined to support a Short Messaging Service (SMS) between a network and a mobile station, performs Packet Switched (PS) and Circuit Switched (CS) combined location update request, which indicates the MME supports the SMS, over an interface (e.g., S6a) between the MME and the HSS/HLR as part of a combined Tracking Area (TA) and Location Area (LA) update procedure.

When the MME receives SMS signalling related to a SMS message, such signalling is forwarded via an Inter-Working Function (IWF). The IWF provides interworking between a Media Access Protocol (MAP) interface and a Diameter interface. Due to the IWF, SGs interface becomes unnecessary, since the MME receives SMS signalling via the IWF using a Diameter interface.

MODE FOR INVENTION

The present description is related to SMS-related operation/procedure in network entities. The support for SMS (Short Messaging Services) in E-UTRAN (Evolved UMTS Terrestrial Radio Access Network) has been one of the most heavily debated topics during the definition of EPS (Evolved Packet System) in, for example, Release 8 (Rel-8) of the pertinent telecommunications technical specifications and protocols. Various proposals related to so-called "native SMS over LTE (Long Term Evolution)" techniques (i.e. native SMS) have been presented, but all of the details could not be agreed upon at the time of conceiving the concepts related to this disclosure.

Although the present description is not limited to Machine Type Communications (MTC), it should be noted that some of features in the present description can be understood in the context of the MTC. In the light of SIMTC (System Improvements for Machine Type Communications), the potential benefits of "native SMS" for M2M communications should be considered and efforts for its potential introduction into Release 11 (Rel-11) and/or future developing technical specifications should be looked into.

It is not intended to suggest any changes on the AS (Access-Stratum) or NAS (Non-Access-Stratum) signaling for SMS over SGs (Service Gateways), and some proposed changes may be restricted to Core Network optimizations.

Figure 1:
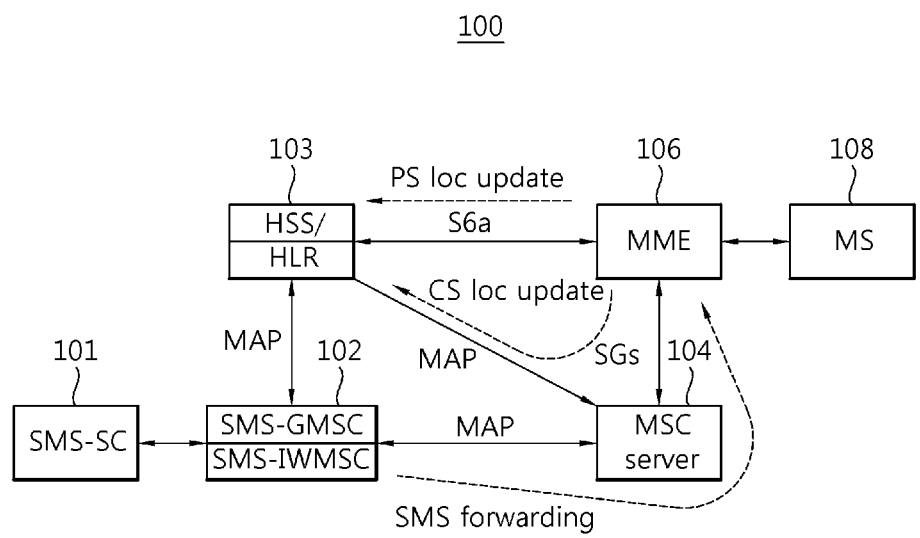
FIG. 1 depicts an exemplary SMS over SGs architecture 100.

FIG. 1 depicts an exemplary SMS over SGs architecture 100.

In the network 100, the SMS-SC (Short Messaging Service-Service Center) entity 101 acts to deliver an SMS message to the MS (Mobile Station) 108 via cooperation with various network entities. Namely, the SMS-SC 101 cooperates with the SMS-GMSC/SMS-IWMSC (SMS Gateway MSC/SMS Interworking MSC) entity 102, which can be referred to as SMS-GMSC or an SMS-IWMSC, to process the SMS forwarding procedures. Next, the SMS-GMSC/SMS-IWMSC 102 cooperates with the MSC (Mobile Switching Center) server 104 over the MAP interface for SMS forwarding. The MSC server 104 in turn, cooperates with the Mobility Management Entity (MME) 106 over the Service Gateway(s) (SGs), which transfer the forwarded SMS message to the MS 108.

Meanwhile the SMS-GMSC/SMS-IWMSC 102 is also connected with the HSS/HLR (Home Subscriber Server/Home Location Register) entity 103, which can be referred to as an HSS or an HLR, via a MAP interface. The HSS/HLR 103 is connected to the MME 106 via the MSC server 104, as depicted. As such, a CS location update is provided from the MME 106 to the HSS/HLR 103. Additionally, the HSS/HLR 103 is connected to the MME 106 via an S6a interface over which the MME 106 provides a PS location update to the HSS/HLR 103.

It can be understood that a potential drawback of this architecture is the duplication of Mobility Management (MM) signaling in the Core Network (CN), whereby every Combined Attach or Combined TA/LA Update request on the radio interface results in two separate location updates in the Core Network, one for the CS (Circuit Switched) domain and one for the PS (Packet Switched) domain.

Another drawback of SMS over SGs is that it requires a CS subscription and an MSISDN for the user, even if the terminal supports only E-UTRAN access. This is clearly undesirable within the scope of the SIMTC work item, which has explicit requirements for MSISDN-less and PS-only communication.

Finally, SMS over SGs requires an MSC Server function, even for mobile network operators who have no 3GPP access.

Figure 2:
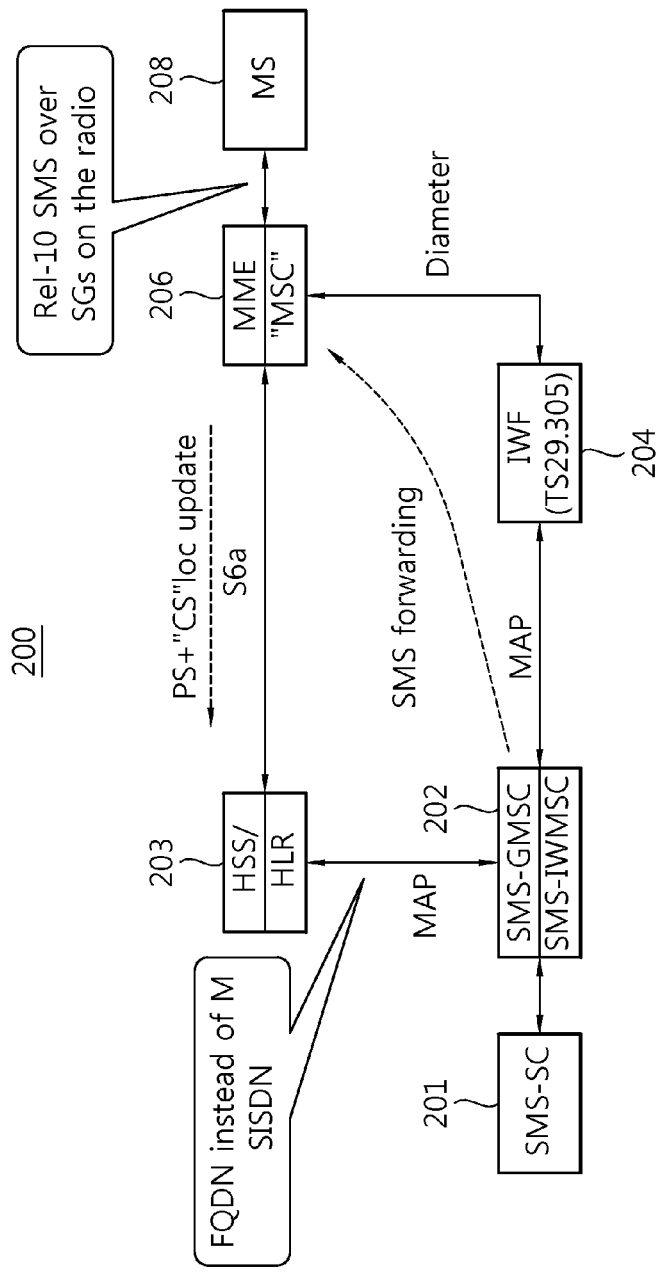
FIG. 2 depicts a possible optimization of the SMS over SGs architecture 200 obtained by merging the "MSC Server" functionality with the MME 206.

FIG. 2 depicts a possible optimization of the SMS over SGs architecture 200 obtained by merging the "MSC Server" functionality with the MME 206. Here, the basic assumption is that any architecture optimization for MTC would also be useful for human-attended UEs that attach over E-UTRAN as "SMS-only", which is why it can be assumed that there are no changes to the NAS or AS protocols.

Given that MM signaling in the optimized architecture is performed over the same interface (i.e. the S6a interface), merging the CS and PS location updates into a single procedure is technically achievable.

By merging the MSC Server functionality into the MME 206, the latter would inherit a MAP interface that is primarily used for SMS forwarding. Having a MAP interface on the MME has been considered unacceptable for many companies in the past, which is why the optimized architecture should allow for a Diameter variant for this interface. In view of the work on MAP-Diameter done in the past, defining an additional set of MAP-Diameter interworking procedures for the SMS-related MAP messages should also be technically feasible.

While the architecture still appears to be "CS+PS" from MS perspective, the "CS domain" in this architecture is completely virtual. The Location Area Identifiers (LAIs) signaled over the radio interface have no special meaning other than identifying the combined MME/MSC node 206 as the destination for mobile terminated SMS. It is true that an MSISDN parameter is required on the MAP interface between the SMS-GMSC 202 and the HLR/HSS 203, but this is likely to change anyway in order to extend the "MSISDN-less" feature to the GERAN and UTRAN.

In consideration of the above issues, the following matters are being proposed. An optimized SMS over SGs architecture for inclusion into the applicable technical standard, such as TS 23.888, is proposed, and the feasibility of MAP-Diameter interworking for SMS forwarding shall be possible. As a result, an optimized SMS over SGs architecture can be provided, as per the present disclosure.

An explanation about the problem(s) to be solved and gains provided by the inventive concepts described herein will be provided.

Although the present description is not limited to M2M communication, there are number of features which can be beneficial to the M2M communication. In order to facilitate M2M communications in GSM, UMTS, LTE, and other wireless communication systems, there are some common service requirements and some specific service requirements. Common service requirements can include general matters, addressing, identifier(s), charging requirements, security requirements, and remote MTC device management. Specific service requirements pertain to MTC features related to low mobility, time controller, time tolerant, packet switched (PS) only, small data transmissions, mobile originated only, infrequent mobile terminated, MTC monitoring, extra low power consumption, location specific trigger(s), and group based MTC features.

In particular, packet switched (PS) only is intended for use with MTC devices that can delay their data transfer during network overload phases in exchange for better rates.

Meanwhile, another issue to be considered is the MTC device trigger. For many M2M applications and use cases, there may be an interest to have a poll model for communications between MTC devices and the MTC server. This may be because the MTC user wants to be in control of communications from the MTC devices, and doing so can prevent MTC devices from randomly accessing the MTC server. Also, for applications where normally the MTC devices initiate communications, there may occasionally be a need for the MTC server to poll data from MTC devices.

For MTC devices that are not continuously attached to the network or that have no "always-on" PDP/PDN connection, it can be beneficial to trigger the MTC devices to attach and/or establish a PDP/PDN connection based on a trigger indication from the MTC server.

The following functionalities are typically required to trigger MTC devices:

The PLMN shall be able to trigger MTC devices to initiate communication with the MTC Server based on a trigger indication from the MTC server.

An MTC device shall be able to receive trigger indications from the network and establish communication with the MTC server when receiving the trigger indication. Possible options are:

receiving trigger indication in detached state and establish communication;

receiving trigger indication in attached state and the MTC device has no PDP/PDN connection; and receiving trigger indication in attached state and the MTC device has a PDP/PDN connection.

It should be noted that there may be some currently available solutions to trigger MTC devices (e.g. unanswered CS call attempts, sending an SMS, etc.). However, these have disadvantages when used at a large scale (e.g. they are based on MSISDNs), and would be difficult to implement only for attached MTC devices.

However, for supporting and implementing MTC techniques in a more appropriate manner, possible improvements over the currently available means for triggering are necessary. Based upon the above described recognition of the currently available techniques, the present inventors conceived the following inventive concepts.

As an implementation, SMR (relay) and SMC (connection) entities are newly implemented into the MME. In order words, the MME only needs to implement the SMR and SMC layers into the MME. In the background art, the MME was "stateless", meaning that the MME just passes messages, but due to this invention, the MME shall have state machines (i.e. the SMR and SMC) added thereto. Thus, the Service Gateway entities are considered to be "combined" or we can say that the Service Gateway entities "disappear". For example, the SMC can directly connect to the EMM in the mobile station to perform call feedback procedures and the like.

Figure 3:
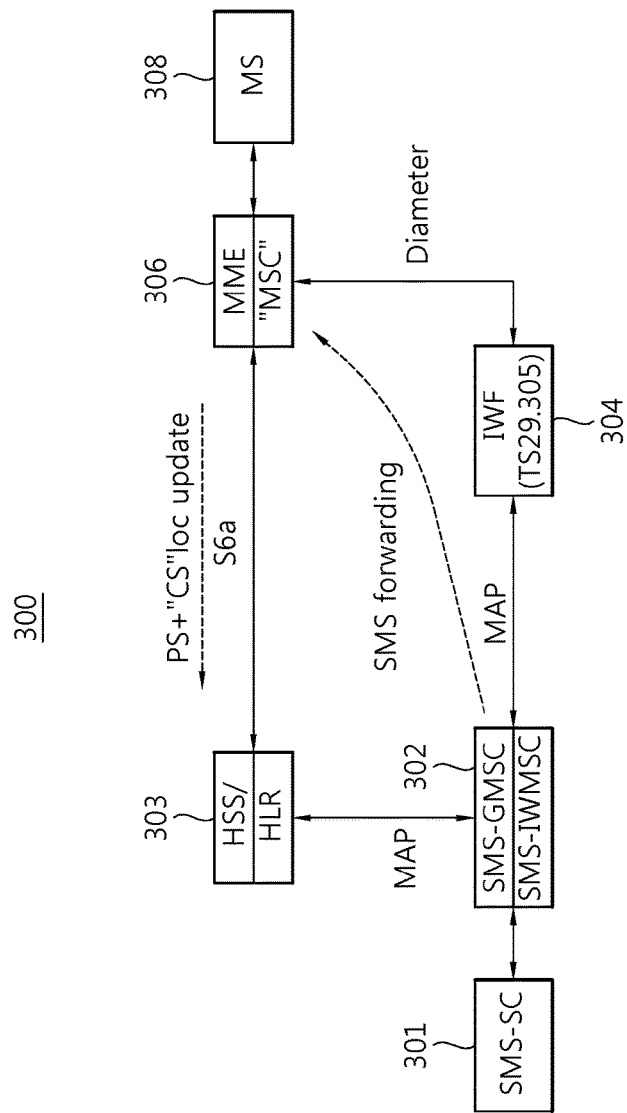
FIG. 3 depicts an optimized SMS over SGs architecture 300 obtained by merging the MSC Server functionality with the MME 306.

FIG. 3 depicts an optimized SMS over SGs architecture 300 obtained by merging the MSC Server functionality with the MME 306. There are practically no changes to the NAS or AS protocols.

In the network 300, the SMS-SC (Short Messaging Service-Service Center) entity 301 acts to deliver an SMS message to the MS (Mobile Station) 308 via cooperation with various network entities. Namely, the SMS-SC 301 cooperates with the SMS-GMSC/SMS-IWMSC (SMS Gateway MSC/SMS Interworking MSC) entity 302 to process the SMS forwarding procedures. Next, the SMS-GMSC/SMS-IWMSC 302 cooperates with a newly defined MME 306, which has certain MSC functionality implemented therein server, via the IWF entity 304 for supporting SMS forwarding. Instead of the Service Gateway(s) (SGs) as in FIG. 1, a Diameter interface between the IWF 304 and the MME 306 is employed for the SMS forwarding. Since the Diameter interface is an interface used by a conventional MME and the SG(s) is an interface used by a conventional MSC, the newly defined MME 306, which has MSC functionality supporting the SMS, can be connected to other core network entities based on the Diameter interface, instead of the SG(s).

It should be noted that the IWF 304 is not essential to the network 300, and thus the IWF 304 can be omitted. In case where the IWF 304 is not employed in the network 300, the SMS-GMSC/SMS-IWMSC 302 may have MAP functionality, whereby the SMS-GMSC/SMS-IWMSC 302 provides a Diameter interface directly to the newly defined MME 306. Namely, the MAP interface which is conventionally used by the MSC is not required between SMS-GMSC/SMS-IWMSC 302 and the MME 306 when the SMS-GMSC/SMS-IWMSC 302 has the MAP functionality.

Meanwhile the SMS-GMSC/SMS-IWMSC 302 is also connected with the HSS/HLR (Home Subscriber Server/Home Location Register) entity 303 via a MAP interface. The HSS/HLR 303 is connected to the MME 306, and a so-called "PS+CS" location update is provided from the MME 306 to the HSS/HLR 303, via the S6a interface. In detail, the MME 306 performs combined Tracking Area (TA) and Location Area (LA) update procedure, whereby mobility management of the MS 308 is performed based on the TA (i.e., associated with the PS location update) and LA (i.e., associated with the CS location update). Given that MM signaling in the optimized architecture is performed over the same interface (i.e. the S6a interface), the CS and PS location updates are merged into a single procedure, which can be understood with reference to FIG. 1.

Put differently, a MAP-Diameter interworking function (IWF) 304 may be used on the SMS forwarding path in order to avoid the need for MAP interface support on the MME node 306. Here, it can be noted that the IWF 304 may be similar to that described in the applicable technical standard, such as 3GPP TS 29.305.

While the architecture 300 still appears to be CS+PS from MS perspective, the CS domain in this architecture is completely "virtual". The Location Area Identifiers (LAIs) signaled over the radio interface have no special meaning other than identifying the combined MME/MSC node 306 as the destination for mobile terminated SMS.

Based on a number of embodiments of the present description, an MSISDN parameter can be still required on the MAP interface between the SMS-GMSC 302 and the HLR/HSS 303, but this is likely to change in order to address the "MSISDN-less" requirement. The replacement of the MSISDN parameter on this interface will not be considered in further detail herein.

Next, the following impacts on existing nodes or functionality can be considered:

Piggybacking of CS domain mobility management messages over S6a.

Optional collocation of MSC Server functionality in the MME for handling of SMS-related MAP procedures (possibly interworked via Diameter).

Addition of MAP-Diameter interworking procedures in the 3GPP TS 29.305 interworking function (IWF) in relation to MAP procedures for SMS.

Hereinafter, detailed procedures are further explained.

As discussed above, the newly defined MME 306 has MSC functionality supporting the SMS, and thus an SMS message and its related signalling can be forwarded from SMS-SC 301 via various network nodes, e.g., SMS-GMSC/SMS-IWMSC 302 and IWF 304. In more detail, after the above-explained PC/CS location update is performed, information on the MME 306 which is currently managing the MS 308 is known to the HSS/HLR 303. Further, SMS-GMSC/SMS-IWMSC 302 which intends to deliver SMS from SMS-SC 301 to the MS 308 acquires updated information from the HSS/HLR 303 and thereafter forwards the SMS to the MME 306. When forwarding the SMS to the MME, the IWF 304 can be further used, and the IWF 304 serves to provide interworking between the MAP interface and the Diameter interface.

When performing the newly-defined PC/CS location update over S6a, information related to the MME 306 is provided to the HSS/HLR 303. For instance, the above-explained CS domain mobility management messages can be provided. Further, it should be noted that an example of FIG. 3 undoubtedly suggests that the HSS/HLR 303 knows that the MME 306 supports the SMS (or that the MME 306 is new type or has MSC functionality) after PC/CS location update (e.g., the TA/LA location update), since if the MME is a conventional one, the HLR/HSS 303 would never allow the SMS to be forwarded to the MME 306. Therefore, the concept of performing the above-explained PS/CS location update over S6a includes providing information, which indicates the MME 306 supports the SMS, to the HSS/HLR 303.

Figure 4:
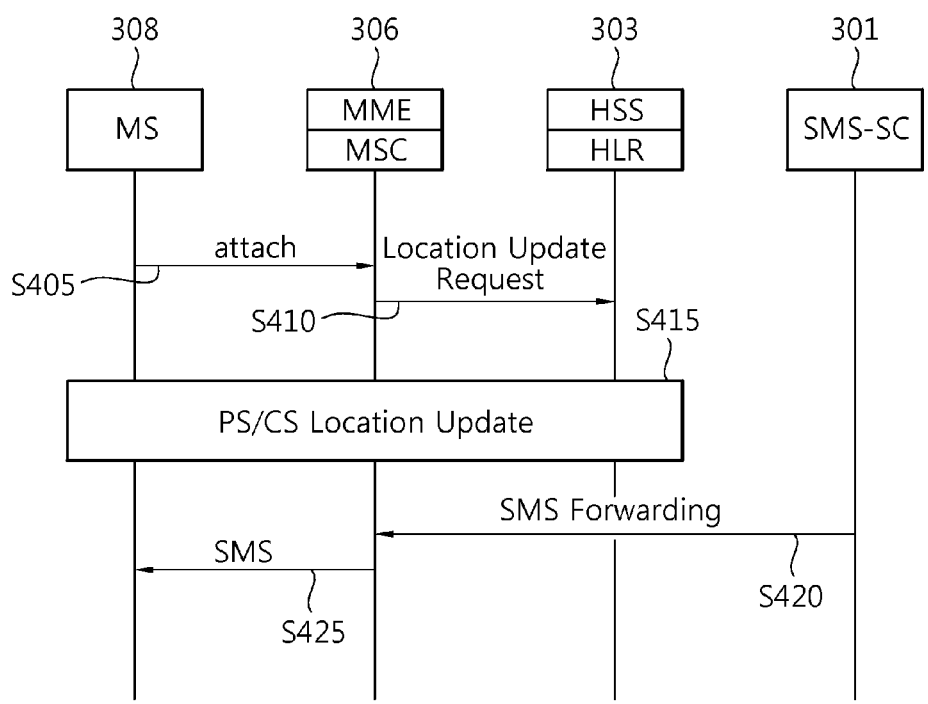
FIG. 4 depicts detailed features of the PS/CS location update depicted in FIG. 3.

FIG. 4 depicts detailed features of the PS/CS location update depicted in FIG. 3. As discussed in FIG. 3, the present description proposes an MME 306 which supports the SMS by means of having MSC functionality. In order to properly handle the SMS, the MME 306 should be successfully registered to the HSS/HLR 303. A method depicted in FIG. 4 is directed to registration of the newly defined MME for the SMS.

As discussed above, the present description proposes PS/CS combined location update over an interface between the MME and the HSS/HLR, and such PS/CS combined location update can be initiated by signalling enabling location update of MS (e.g., attach request, combined ISMI attach request, or Combined TA/LA update) (S405). In response the request of the UE, the MME 306 sends a PS/CS combined location update request over an interface (e.g., S6a) between the MME 306 and the HSS/HLR 303.

As discussed above, the PS/CS combined location update request performed in S410 includes an indicator (or flag/control information) indicating that the MME 306 supports the SMS. For instance, the proposed indicator can be used by the MME 306 to notify the HSS/HLR 303 the MME 306 is capable of SMS transfer without the need of establishing the above-mentioned SGs association with an MSC. If the MME 306 does not support SMS transfer, the HSS/HLR 303 may not send SMS-related information to the MME 306 within ULA (3GPP-Update-Location-Answer). Further, if the HSS/HLR 303 does not support this feature, the HSS/HLR 303 may ignore any request for a registration for Mobile-Terminated (MT) SMS; the MME 303 may store the indicator, and not send any further request of a registration for MT SMS to the HSS/HLR 303.

Further, the PS/CS combined location update request performed in S410 may include various fields or elements. For instance, preference information on whether the MME prefers using SMS transfer functionality can be further included. In detail, the preference information may indicate that the MME prefers (or not) using SMS transfer functionality. In addition, the PS/CS combined location update request performed in S410 may further include information element(s) containing any identification (or number) information (e.g., ISDN number) of the MME 306 to route SMS related signalling to the MS 308 through the MME 306. In addition, the PS/CS combined location update performed in S410 may further include information indicating the MS 308 requested that any potential registrations with CS domain is only for obtaining SMS and not any other services from CS domain, which is corresponding to the above-explained 'attach over E-UTRAN as SMS-only'.

In response the PS/CS combined location update request, the HSS/HLR 303 transmits a response (not depicted) to the MME 306, thereby completing the PS/CS combined location update. (S415).

After the MME 306 is successfully registered, MT SMS can be forwarded to the MS 308 via the MME 306. In particular, SMS signalling associated with the MT SMS message to be delivered to the MS 308 is received via the IWF 304 from the SMS-GMSC/SMS-IWMSC 302 as explained in FIG. 3 (S420). When the SMS signalling is forwarded to the MME 306, the Diameter interface is used between the IWF 304 and the MME 306. Alternatively, such SMS signalling can be received directly from the SMS-GMSC/SMS-IWMSC 302 when the IWF 304 is not employed in the network 300. In either case, SMS transfer is performed without the need of establishing the above-mentioned SGs association with the MSC. When the related signalling is forwarded to the MME 306, a MT SMS message can be delivered to the MS 308 by using such signalling. (S425).

Upon evaluation of the proposals and concepts described herein, the following benefits may be achieved:

The amount of MM (mobility management) signalling in the Core Network for E-UTRAN devices can be halved;

Allows for PS-only subscription for devices connecting via E-UTRAN;

There are no changes to the AS or NAS protocols, which is why this architecture can also be used for human-attended UEs that attach over E-UTRAN as "SMS-only".

Hereafter, some additional explanations about the embodiments of the present invention will be described. The MTC device triggering technique is a control plane procedure that employs use of the user plane. The packet switched (PS) domain uses IP packets for communication transfer procedures. The circuit switched (CS) domain uses circuits or "pipes" for communication transfer procedures. Non-Access-Stratum (NAS) signaling includes Mobility Management (MM), Session Management (SM), and Core Control (CC) techniques.

Here, SMS messages can be included in MM signaling (i.e., SMS signalling). When the SMS-SC gets an SMS to be delivered, the HLR/HSS gives information about the MSC, the SGSN, or both. Practically, information about only the MSC is provided. The basic inventive concept of this description is based on the wish to avoid dependency on the MSC server when supporting an LTE-only device. In other words, use of the CS domain is to be avoided, and use of legacy protocol in the MME should be avoided as well.

Under the LTE scheme, SMS delivery over the E-UTRAN relies on MSC servers, which has its drawbacks. Thus, the need for having to go through one or more MSC servers in order to support LTE-only devices for MTC should be avoided. In order to achieve this, some MSC functionalities are to be added into the MME. Such MSC functionalities can include the handling of SMS over the radio interface in order to support the short message relay protocol (SM-RP) and the short message control protocol (SM-CP), which are Short Message RP and CP protocols, as defined in, for example, 3GPP TS 24.011.

Also, the so-called Diameter interface for SMS forwarding (as defined in, for example, 3GPP TS 29.305: Mapping of Procedures), as well as CS-fallback (as defined in, for example, 3GPP TS 23.272) are to be supported.

For example, the MS (or User Equipment) should use and take advantage of the PS domain (for SMS) when connected to a 2G/3G network, and should use and take advantage of the CS domain (for SMS) when connected to an LTE network. In such manner, there is little or no practical impact to the UE, unlike some other proposals.

The concepts described thus far provide an apparatus comprising: a Mobility Management Entity (MME) comprising at least one entity or layer having Mobile Switching Center (MSC) functionality to support a Short Messaging Service (SMS) between a network and a mobile station by employing Machine-to-Machine (M2M) or Machine Type Communication (MTC) protocols.

Here, the at least one entity or layer comprises: a first state machine entity or layer that supports relay functions to perform forwarding of SMS messages to the mobile station. The at least one entity or layer further comprises: a second state machine entity or layer that supports connection functions with at least an HSS/HLR (Home Subscriber Server/Home Location Register), and with an SMS-SC (Short Messaging Service-Service Center) or GMSC/IWMSC (Gateway MSC/Interworking MSC). The first state machine entity or layer is a State Machine Relay (SMR) and the second state machine entity or layer is a State Machine Connection (SMC). The connection functions with the HSS/HLR allow for a combined Packet Switched (PS) and Circuit Switched (CS) location update message to be sent to the HSS/HLR. The combined PS and CS location update message is sent to the HSS/HLR via an S6a interface. The connection functions with the GMSC/IWMSC allow for the forwarding of SMS messages to the mobile station via an interworking function (IWF). The GMSC/IWMSC and the IWF communicate over a MAP interface, and the MME and the IWF communicate over a Diameter interface.

Figure 5:
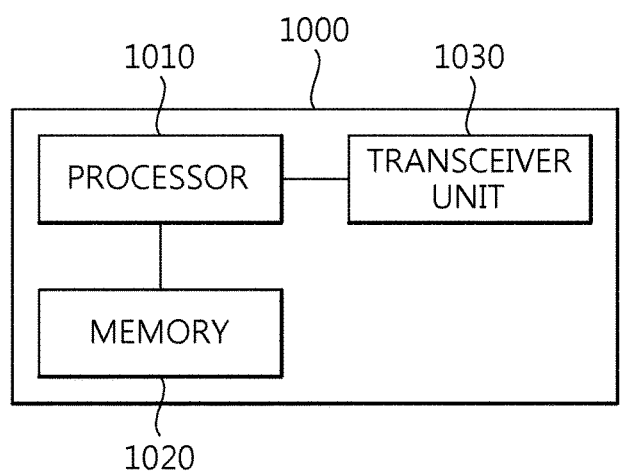
FIG. 5 is a block diagram showing a wireless apparatus to implement technical features of this description.

FIG. 5 is a block diagram showing a wireless apparatus to implement technical features of this description. This may be a part of a core network (CN) entity. The wireless apparatus 1000 may include a processor 1010, a memory 1020 and a transceiver unit 1030.

The processor 1010 may be configured to implement proposed functions, procedures and/or methods described in this description. Layers of the radio interface protocol may be implemented in the processor 1010. The processor 1010 may handle a procedure explained above. The memory 1020 is operatively coupled with the processor 1010, and the transceiver unit 1030 is operatively coupled with the processor 1010.

The processor 1010 may include application-specific integrated circuit (ASIC), other chipset, logic circuit and/or data processing device. The memory 1020 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in memory 1020 and executed by processor 1010. The memory 1020 can be implemented within the processor 1010 or external to the processor 1010 in which case those can be communicatively coupled to the processor 1010 via various means as is known in the art.

The features and concepts herein are applicable to and can be implemented in various types of user devices (e.g., mobile terminals, handsets, wireless communication devices, etc.) and/or network devices, entities, components, etc. that can be configured to support M2M or MTC devices in an LTE network or the like.

As the various concepts and features described herein may be embodied in several forms without departing from the characteristics thereof, it should also be understood that the above-described embodiments are not limited by any of the details of the foregoing description, unless otherwise specified, but rather should be construed broadly within its scope as defined in the appended claims. Therefore, all changes and modifications that fall within such scope or equivalents thereof are therefore intended to be embraced by the appended claims.

The invention claimed is:

1. A method of handling signals for Short Messaging Service (SMS) in a wireless network including a Home Subscriber Server (HSS), the method comprising:
   requesting, by a mobile station (MS) to a Mobility Management Entity (MME) supporting SMS functionality in the MME, a combined Tracking Area (TA) and Location Area (LA) update for Packet Switched (PS) and Circuit Switched (CS) domains so that the MME sends to the HSS a location update request over an S6a interface configured between the MME and the HSS for the combined TA and LA update, the location update request comprising preference information indicating a predefined preference to use the SMS functionality in the MME, an information element containing identification information of the MME, and information indicating the MS requested that any potential registrations with CS domain is only for obtaining the SMS; and
   receiving, by the MS, the SMS triggered by an SMS signaling, which is configured by an SMS Service Center (SMS-SC) or an SMS Gateway MSC/Interworking MSC (SMS-GMSC/IWMSC) based on the location update request.

2. The method of claim 1, wherein the TA update is related to PS domain procedures and the LA update is related to CS domain procedures.

3. The method of claim 1, wherein the MS is a single mode E-UTRAN device.

4. The method of claim 3, wherein the MS is a Long Term Evolution (LTE)-only device.

5. The method of claim 1, wherein the MS is a machine-type communication (MTC) device.

6. A mobile station (MS) of handling signals for Short Messaging Service (SMS) in a wireless network including a Home Subscriber Server (HSS), the MS comprising:
   a transceiver configured to configured to transmit and receive a signal; and
   a processor coupled to the transceiver and configured to:
      request, to a Mobility Management Entity (MME) supporting SMS functionality in the MME, a combined Tracking Area (TA) and Location Area (LA) update for Packet Switched (PS) and Circuit Switched (CS) domains so that the MME sends to the HSS a location update request over an S6a interface configured between the MME and the HSS for the combined TA and LA update, the location update request comprising preference information indicating a predefined preference to use the SMS functionality in the MME, an information element containing identification information of the MME, and information indicating the MS requested that any potential registrations with CS domain is only for obtaining the SMS, and
      receive the SMS triggered by an SMS signaling, which is configured by an SMS Service Center (SMS-SC) or an SMS Gateway MSC/Interworking MSC (SMS-GMSC/IWMSC) based on the location update request.

7. The mobile station of claim 6, wherein the TA update is related to PS domain procedures and the LA update is related to CS domain procedures.

8. The mobile station of claim 6, wherein the MS is a single mode E-UTRAN device.

9. The mobile station of claim 8, wherein the MS is a Long Term Evolution (LTE)-only device.

10. The mobile station of claim 6, wherein the MS is a machine-type communication (MTC) device.

* * * * *